United States Patent [19]

Böckeler et al.

[11] Patent Number: 4,922,386

[45] Date of Patent: May 1, 1990

[54] DIMMED VEHICLE HEADLIGHT

[75] Inventors: Franz-Josef Böckeler, Soest; Wolfgang Gobmann, Kamen-Methler; Axel Buchhorn, Bad Sassendorf; Horst Jackenkroll, Hamm; Hubert Marks, Geseke; Karl Witte, Lippstadt; Diethard Schnelle, Erwitte, all of Fed. Rep. of Germany

[73] Assignee: Hella KG Hueck & Co., Lippstadt, Fed. Rep. of Germany

[21] Appl. No.: 392,064

[22] Filed: Aug. 10, 1989

[30] Foreign Application Priority Data

Aug. 13, 1988 [DE] Fed. Rep. of Germany ....... 3827594

[51] Int. Cl.$^5$ .................... B60Q 1/00

[52] U.S. Cl. .................... 362/61; 362/303; 362/305; 362/308; 362/328; 362/346

[58] Field of Search .................... 362/61, 305, 308, 303, 362/328, 346, 348

[56] References Cited

U.S. PATENT DOCUMENTS

| | | | |
|---|---|---|---|
| 4,677,532 | 6/1987 | Peitz | 362/61 |
| 4,727,458 | 2/1988 | Droste | 362/61 |
| 4,797,790 | 1/1989 | Brodling | 362/61 |

*Primary Examiner*—Douglas Hart

*Attorney, Agent, or Firm*—Griffin, Branigan & Butler

[57] ABSTRACT

A projection-type vehicle headlight includes a sheet metal support (11) which provides a light shield (3) between a convex lens (2) and a reflector (1). The support is rigid and has arms (12) which are fastened to the ellipsoid-formed reflector. The arms are appended to a lens frame (13), which receives the lens, of the support. The light shield is in the form of a spherical bulge which extends, or is convex, toward a light source (5), the bulge being produced by "drawing out" areas of the support lying within the lens frame. A light shield edge (6) is formed by "blanking out" an opening in a top half of the spherically shaped bulge.

10 Claims, 3 Drawing Sheets

DIMMED VEHICLE HEADLIGHT

This invention relates generally to the art of vehicle headlights and more particularly to headlights having light shields therein for producing desired light patterns.

In one such well known vehicle headlight disclosed in German Patent Document DE PS 35 16 812, a support therein includes a bowl shaped sheet metal part produced by a drawing process. Arms of the support, which are attached to a reflector, are cut from an outer shell wall of the bowl shaped sheet metal part. A further arm, that is cut from this metal wall, includes an end part which is bent toward an optical axis of the headlight to serve as a light shield. An opening is "cut out" of a floor of the bowl shaped sheet metal part which is surrounded by an edge zone of a lens frame which extends to the arms. Support surfaces for a lens which is set in the lens frame from the underside of the bowl shaped support are free ends of tongues which are cut from the lens frame and are bent radially inwardly. In order to ensure that the support surfaces are exactly in a plane at right angles to the optical axis, it is necessary that ends of the tongues have additional work performed thereon such as by further bending and/or cutting. In any case, such tongues can only be produced by adjustable tool parts. Still further, because of large tolerances when one product sheet metal parts, it is necessary to adjust such a light shield about a bending line perpendicular to an optical axis, until the light-shield edge is exactly in a focus area of a complex lens system. In order to prevent a springing back of light shield, and in order to cause light shield to hold a fixed position, it is necessary to employ further processing steps for attaching the light shield to adjacent arms of the support for example by laser welding.

In one well known headlight described in West German Patent Document DE-OPS 35 29 546, the lens is set between arms of a support in a lens frame and lies on a circular shaped support surface of the lens frame which is directed toward the reflector. Further, a light shield is placed between the arms of the support and attached to the lens frame. Such a mounting of the lens and the light shield is awkward and time consuming. The light shield is constructed from a strip of sheet metal which is formed to have a half circle arc, or bow, by means of an indefinite number of bend lines perpendicular to a length axis. Because end parts required to form such a bow can produce irregular spring action, there is a relatively large tolerance zone for the distance between a middle zone of the light shield edge and a support area for the lens. Thus, it is not guaranteed that the middle area of the light shield edge, is exactly in the focus point or focus area of the lens. Only if the light shield edge is in the focus area of the lens is a bright/dark border sharply produced.

It is an object of this invention to provide an improved headlight in which the distance between a bright/dark border producing light shield edge and a lens is a fixed, and unchangeable, measurement which can be assured in advance by the dimensions of tool parts.

Further, it is an object of this invention to provide an improved headlight in which a lens can be lightly inserted from the front thereof after a lens support is mounted on a reflector and in which a light shield is very rigidly mounted without the use of additional attaching elements.

SUMMARY OF THE INVENTION

A vehicle headlight includes a support constructed of sheet metal for supporting a convex lens and providing a light shield positioned between the lens and a reflector. The support includes rigid arms for attaching the support to the reflector, the arms being appended to a lens frame. The light shield is formed by drawing a portion of the sheet metal support encircled by the lens frame toward the reflector so as to form a spherical bulge toward the reflector as well as a lens supporting surface. An edge of the light shield is formed by blanking, or cutting, out an opening in an upper half of the spherically shaped bulge.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
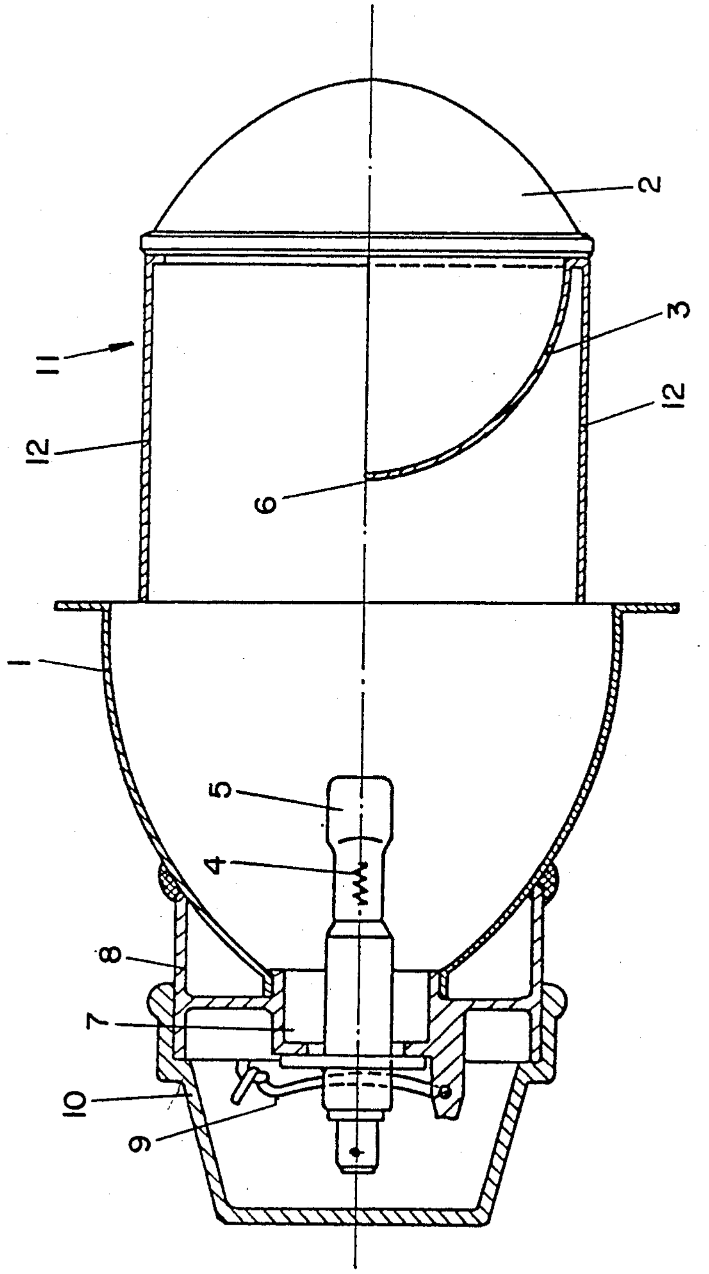
FIG. 1 is a vertical cross-section taken along an optical axis of a headlight showing a lens, a light shield, and a reflector forming an optical unit of a headlight.

A dimmed vehicle headlight of FIG. 1 is constructed mainly of an ellipsoid formed reflector 1 and a light shield 3 positioned between a convex lens 2 and the reflector 1. An interior reflection surface of the reflector 1 describes half ellipses in planes parallel to a length axis. A filament 4 of a bulb 5 is arranged at a focal point of these half ellipses. A bright/dark border producing light-shield edge 6 of the light shield 3 is in a focal area, including a focal point, of the lens 2. The ellipsoid-formed reflector 1 has an opening 7 at an apex thereof for receiving a circular lamp mount 8. The bulb 5 is placed in the lamp mount 8 from a backside of the reflector 1 and a flange thereof is held by a spring wire 9 against an outside surface of the lamp mount 8. A rubber cap 10 is placed on the lamp mount 8.

Figure 2:
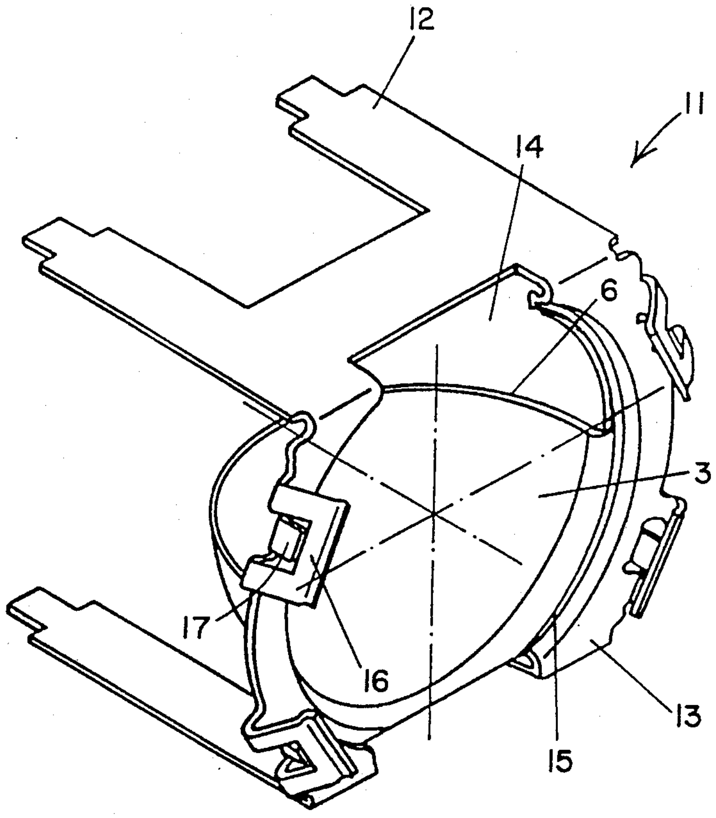
FIG. 2 is a perspective view of a support of this invention, including the light shield, produced of one piece of sheet metal material

The light shield 3 is fabricated as one piece with a sheet metal support 11 whose arms 12 are coupled with a peripheral area of the reflector 1. The arms 12 of the support 11 are appended to an outer periphery of a lens frame 13 of the one piece support 11. The lens 2 is set in the lens frame 13 from the light-exiting side of the support 11. A spherically-shaped bulge 3 of the support 11 is produced by drawing a portion of sheet metal within the lens frame 13 in the direction of the arms 12 or the reflector 1. An outer periphery of the spherically formed bulge has a diameter which is somewhat smaller than the outside diameter of the lens 2. When the spherical bulge light shield 3 is drawn, a supporting circular surface 15 is also drawn in the sheet metal of the support 11. This supporting surface 15 is displaced, step fashion, toward the reflector 1 as the circular surface 15 is formed. An opening 14 is blanked, or cut, out of a portion of the support 11, including the bulge, which receives light from both an upper half and a lower half of the bulb 6, and, as can be seen in FIG. 2, this opening extends to a sidewall from which the arms 12 are cut and to the lens frame 13.

When the lens 2 is placed in the support 11 from the light- exiting side thereof, the lens lies with its back side on the circular supporting surface 15. Thereafter, free ends of first and second holding tabs 16 and 17 are bent toward the center of the lens 2. In this manner, the free end of the first holding tab 16 lies with tension against the periphery of the lens and is held in this position by the second holding tab 17. That is, after the first holding tab is bent over, it is not allowed to spring back. In this manner, a rattle free mounting of the lens 2 in the support 11 is guaranteed.

It can be seen in the depicted embodiment that the light-shield edge 6 is horizontal and crosses the center point of the spherical bulge. The center of the spherical bulge is approximately at an optical axis of the headlight.

Figure 3:
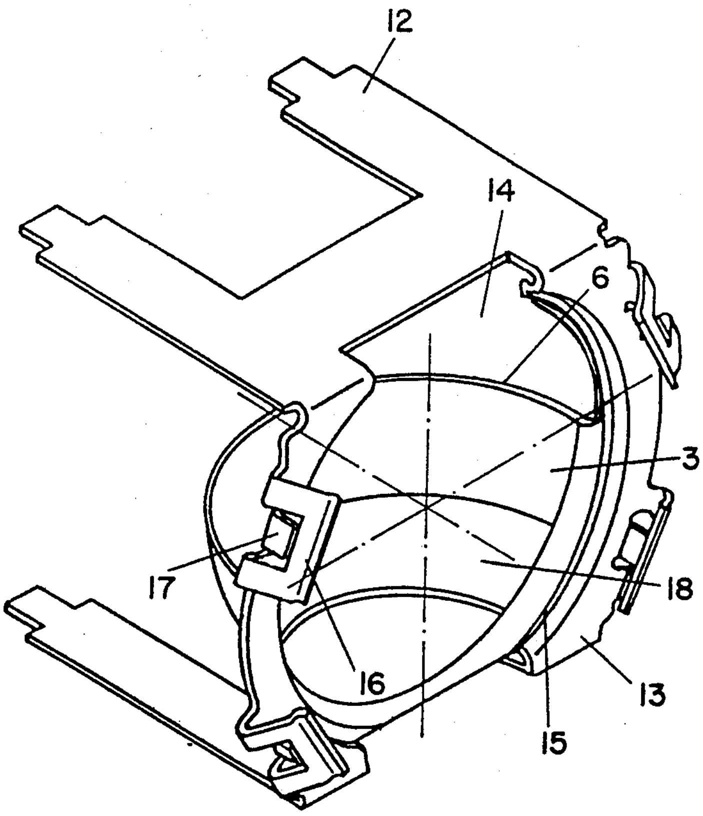
FIG. 3 is a perspective view as in FIG. 2 of an alternate embodiment with a cut-out in a bulge.

A modified embodiment is disclosed in FIG. 3 in which a lower half of the spherically formed bulge of the support has a cut-out 18 therein.

It will be understood by those of ordinary skill in the art, that the spherical-shaped bulge can be quite easily produced by a sheet metal drawing process.

Also, it is beneficial for the light-shield edge to be defined by a blanking, or punching out, of the entire upper half of spherically-shaped bulge. In this manner, most of the light which passes through the opening is not directed upwardly and therefore cannot blind oncoming traffic. Also, this reduces the mass of the relatively heavy lens supporting area of the support.

It is also beneficial that the circular supporting surface 15 for the lens is displaced by means of a surrounding step toward the reflector from the rest of the lens frame. In this manner, not only is the lens fixed in the radial direction, but also the position of the light-shield edge is quite exact relative to the lens because the step-displaced circular supporting surface and the spherically-bulged light shield are simultaneously produced from that area of material in the middle of the support.

With a spherical bulge having a blanked out opening in the upper half thereof, it is beneficial that the light shield and the support, on those sides directed toward the reflector, do not have to be colored black in order to absorb light. A blackening of these sides is not necessary because below the light shield edge light beams from the bulb are screened from outside by the light shield and the support, and those beams which strike the light shield are scattered toward the reflector so that they do not blind opposite traffic.

In a particularly beneficial further embodiment of the invention, the lower half of the spherical bulge of the support has a blanked out opening therein. In such an arrangement, air between the light shield and the lens cannot get so hot and thereby unduly heat members attaching the support to the reflector. This is particularly important if the reflector is constructed of a heat sensitive plastic.

While the invention has been particularly shown and described with reference to a preferred embodiment, it will be understood by those skilled in the art, that various changes in form and detail may be made therein without departing from the spirit and scope of the invention. For example, the sheet metal drawing step could be accomplished by molding tools of various types. Also, the opening 14 can be produced at various times and in various manners in the process; however, in one embodiment a hemispherical bulge is first created from material within the lens frame 13 and then the opening is cut out to create approximately a ¼ spherical bulge.

The embodiment of the invention in which an exclusive property or privilege are claimed are defined as follows:

1. In a dimmed vehicle headlight of the type having a reflector, a light source located at an inside focus position of the reflector, a lens, and a lens frame in which the lens is set, the lens frame being part of a sheet metal support which has arms at an outer periphery of the lens frame attached to the reflector and which has, molded of one piece with the rest of the sheet metal support, a light shield edge located approximately at an internal focus area of the lens that determines a bright/dark border of a light bundle exiting the headlight, the improvement wherein:

the light shield is a bulge toward the light source drawn out of material of the sheet metal support located at areas inside the lens frame, the light shield edge being defined by an opening in an upper half of the bulge, with the size of the periphery of the bulge, being at least slightly smaller than the outside periphery of the lens, at least a central portion of the shield edge extending across an interior focus area of the lens, with the side of the lens facing the reflector lying on a lens-support surface at the lens frame.

2. In a dimmed vehicle headlight as in claim 1 wherein the bulge is spherical and the opening is produced by eliminating the entire upper half of the spherical bulge above the light sheild edge.

3. In a dimmed vehicle headlight as in claim 2 wherein the lens support surface is circular and wherein the cylinder lens support surface is displaced from the rest of the lens frame toward the reflector by a surrounding step.

4. In a dimmed vehicle headlight as in claim 1 wherein the lens support surface is circular and wherein the cylinder lens support surface is displaced from the rest of the lens frame toward the reflector by a surrounding step.

5. In a dimmed vehicle headlight as in claim 1 wherein the lower half of the spherically formed bulge of the support has a cut-out therein.

6. In a dimmed vehicle headlight as in claim 1 wherein the opening in the spherically formed bulge has the shape of a length-wise cut.

7. A method of manufacturing a dimmed vehicle headlight of the type having a reflector, a light source located at an inside focus position of the reflector, a lens, and a lens frame in which the lens is set, the lens frame being part of a sheet metal support which has arms at an outer periphery of the lens frame attached to the reflector and which has, molded of one piece with the rest of the sheet metal support, a light shield edge located approximately at an internal focus area of the lens that determines a bright/dark border of a light bundle exiting the headlight, the steps:

bulging a portion of the light shield toward the light source by drawing out material of the sheet metal support located at areas inside the lens frame and punching out an opening in an upper half of the bulge to define the light shield edge, with the size of the periphery of the bulge, being at least slightly smaller than the outside periphery of the lens, at least a central portion of the shield edge extending across an interior focus area of the lens, with the side of the lens facing the reflector lying on a lens-support surface of the lens frame.

8. In a method of claim 7, wherein the bulge is drawn to be spherical and the entire upper half of the spherical bulge is eliminated to produce said opening.

9. In a method as in claim 7, wherein the lens support surface is drawn to be displaced from the rest of the lens frame toward the reflector by a surrounding step in the same step in which the bulge is drawn.

10. In a dimmed vehicle headlight as in claim 7 wherein the lens support surface is drawn to be circular and to be displaced from the rest of the lens frame toward the reflector by a surrounding step in the same step in which the bulge is drawn.

* * * * *